(12) United States Patent
Burtz et al.

(10) Patent No.: US 8,706,462 B2
(45) Date of Patent: Apr. 22, 2014

(54) SYSTEM AND METHOD FOR PROVIDING A PHYSICAL PROPERTY MODEL

(75) Inventors: Olivier M. Burtz, Wimbledon (GB); Charlie Jing, Houston, TX (US); Dmitriy A. Pavlov, The Woodlands, TX (US); Scott C. Hornbostel, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 671 days.

(21) Appl. No.: 12/890,198

(22) Filed: Sep. 24, 2010

(65) Prior Publication Data
US 2011/0155389 A1 Jun. 30, 2011

Related U.S. Application Data

(60) Provisional application No. 61/291,470, filed on Dec. 31, 2009, provisional application No. 61/300,324, filed on Feb. 1, 2010.

(51) Int. Cl.
*G06F 9/455* (2006.01)

(52) U.S. Cl.
USPC .......................................................... 703/10

(58) Field of Classification Search
USPC .......................................................... 703/10
See application file for complete search history.

(56) References Cited

U.S. PATENT DOCUMENTS

| | | | |
|---|---|---|---|
| 5,889,729 A | 3/1999 | Frenkel et al. | |
| 7,308,139 B2 * | 12/2007 | Wentland et al. | 382/181 |
| 7,333,893 B2 | 2/2008 | Burtz et al. | |
| 7,383,132 B2 | 6/2008 | Green et al. | |
| 7,418,350 B2 | 8/2008 | Stinson et al. | |
| 7,716,029 B2 | 5/2010 | Couet et al. | |
| 7,725,266 B2 | 5/2010 | Sirgue et al. | |
| 2008/0136420 A1 | 6/2008 | Velikhov et al. | |
| 2009/0006053 A1 | 1/2009 | Carazzone et al. | |
| 2009/0096457 A1 | 4/2009 | Srnka et al. | |
| 2009/0150124 A1 * | 6/2009 | Wilt et al. | 703/1 |
| 2009/0157320 A1 | 6/2009 | Abubakar et al. | |

FOREIGN PATENT DOCUMENTS

| | | |
|---|---|---|
| WO | WO 2007/145694 | 12/2007 |
| WO | WO 2008/042081 | 4/2008 |
| WO | WO 2008/066628 | 6/2008 |

OTHER PUBLICATIONS

Boschetti, F. et al. (2000), "Comparison between interactive (subjective) and traditional (numerical) inversion of Genetic Algorithms", *IEEE*, pp. 522-528.

* cited by examiner

*Primary Examiner* — Saif Alhija
(74) *Attorney, Agent, or Firm* — ExxonMobil Upstream Research Company Law Dept.

(57) ABSTRACT

There is provided a system and method for creating a physical property model representative of a physical property of a region. An exemplary method comprises transforming information from a model domain that represents the physical property model into simulated data in a data domain, the data domain comprising simulated data and measured data representative of a plurality of observations of the region. The exemplary method also comprises determining an areal misfit between the simulated data and the measured data representative of the plurality of observations of the region. The exemplary method additionally comprises performing an evaluation of the areal misfit based on known criteria. The exemplary method comprises adjusting data in the data domain or information in the model domain corresponding to a region in the model domain based on the evaluation of the areal misfit.

23 Claims, 13 Drawing Sheets

SYSTEM AND METHOD FOR PROVIDING A PHYSICAL PROPERTY MODEL

CROSS-REFERENCE TO RELATED APPLICATIONS

This application claims the benefit of U.S. Provisional Patent Applications 61/291,470, filed 31 Dec. 2009, entitled System and Method for Providing a Physical Property Model and 61/300,324, filed 1 Feb. 2010, entitled System and Method for Providing a Physical Property Model, each of which is incorporated in its entirety by reference herein.

FIELD

The present techniques relate to a system and method for providing a physical property model representative of a physical property. In particular, an exemplary embodiment of the present techniques relates to performing misfit analysis as part of the improvement of a physical property model.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Many applications involve processing information about physical properties. When processing information relating to physical properties of complex systems, it may be desirable to provide a physical property model representative of physical properties that are useful for a specific purpose. In the field of hydrocarbon exploration, examples of properties that may be useful include resistivity and seismic impedance. These properties may help hydrocarbon exploration professionals to locate hydrocarbon resources in the subsurface of the earth or to improve production of known hydrocarbon resources.

One example of information processing is the transformation of information residing in a first domain into information residing in a second domain. Such a transformation may be desirable because, for example, acquired or measured information may inherently reside in a first domain, such as a data domain. When expressed in the data domain, the information may not be directly useful for a desired purpose such as hydrocarbon exploration. By transforming the information residing in the data domain into a second domain, such as a model domain, the information may be more useful for the desired purpose. The information in the model domain may comprise a physical property model representative of a physical property of interest.

FIG. 1 is a block diagram that is useful in explaining the improvement of the accuracy of a physical property model in a model domain through one or more cycles of forward modeling and model updates. The diagram is generally referred to by a reference number 100. A model domain 102 comprises information that describes one or more physical properties of a region. The physical properties described in the model domain may be useful for performing tasks such as hydrocarbon exploration. For example, the model domain 102 may comprise information that describes controlled source electromagnetic (CSEM) properties such as resistivity and/or seismic properties such as seismic impedance.

One known technique for gaining relevant information about subsurface regions employs a forward modeling process 104 to transform information from the model domain 102 into a data domain 106. The data domain 106 comprises data obtained from actual observation and may also include modeled or simulated data created by the forward modeling process 104.

To improve the predictive capability of information in the model domain 102, simulated data created by the forward modeling process 104 may be compared to actual observed data in the data domain 106. Differences or misfit between the simulated data created by the forward modeling process 104 may be used to make adjustments to the corresponding information in the model domain 102 so that subsequent iterations of the forward modeling process 104 produce simulated data that more closely matches actual known or observed data. When the misfit is small for simulated data for which corresponding known or observed data exists, the accuracy of simulated data for which no corresponding known or observed data exists may be assumed.

Data in the data domain 106 may be transformed into information in the model domain 102 through a model update process 108. Moreover, the accuracy of information in the model domain 102 may be systematically improved by iteratively performing the steps of transforming information from the model domain 102 into simulated data in the data domain 106 via the forward modeling process 104, comparing the misfit of known data values with the simulated data in the data domain, then performing the model update process 108 to adjust the model domain property values.

Information in the model domain 102 may also be transformed into a derived model 112 through the use of a rock physics evaluation process 110. Examples of properties that may be expressed as derived models 112 include lithology, fluid type, saturation or the like. The model update process 108 typically involves the use of very large amounts of data from the data domain 106. Because of the scope of the amount of data that is used, current practices provide only a single global or average data misfit or error for an entire iteration of the model update process 108.

FIG. 2 is graph that is useful in explaining a known technique of using a global or average error to improve the accuracy of a physical property model. The graph is generally referred to by the reference number 200. A y-axis 202 is a logarithmic scale showing misfit between simulated data produced by the forward modeling process 104 relative to known data in the data domain 106. An x-axis 204 shows a number of iterations of performing the forward modeling process 104. A trace 206 shows a significant decrease in average misfit through a first inversion round of about 12 iterations. Toward the end of the first inversion round, the reduction in misfit slows, which may be taken as in indication that further significant reduction in average misfit is unlikely given the information in the model domain 102. At the end of the first inversion round, the information in the model domain 102 may be adjusted prior to beginning a second inversion round.

A trace 208 shows that average misfit is initially improved for the second inversion round relative to the start of the first inversion round. The reduction of average misfit does not, however, decline as dramatically during the second inversion round. A decline in the rate of average misfit improvement after about 17 iterations indicates that significant reduction in average misfit is unlikely based on the current information in the model domain 102. After the second inversion round is completed, the information in the model domain 102 may again be adjusted prior to beginning a third inversion round.

A trace 210 shows that average misfit is initially improved for the third inversion round relative to the start of the second inversion round. A decline in the rate of average misfit improvement after about 25 iterations indicates that significant reduction in average misfit is unlikely to continue based on the current information in the model domain 102. At the end of the third inversion round, it may be determined that further improvement in the reduction of misfit is unlikely to justify subsequent rounds of inversion.

FIG. 3 is a graph that shows a degree of misfit between actual data and simulated data for individual data elements. The graph is generally referred to by the reference number 300. The graph 300 is useful in explaining the inherent limitations in using average misfit as a measure of determining whether subsequent rounds of inversion are justifiable.

A y-axis 302 is a logarithmic scale showing a degree of misfit between simulated data produced by the forward modeling process 104 (FIG. 1) relative to known data. An x-axis 304 represents distance in units of meters. A first actual data trace 306a corresponds to an actual data element in the data domain 106 (FIG. 1). The first actual data trace 306a may represent data at 0.25 Hz gathered by a single receiver in a field experiment. A first simulated data trace 308a represents simulated data (also at 0.25 Hz) from the forward modeling process 104 (FIG. 1) that is intended to correspond to the actual data represented by the first actual data trace 306a. Similarly, a second actual data trace 306b corresponds to an actual data element in the data domain 106 (FIG. 1). The second actual data trace 306b may represent data at 2.5 Hz gathered by a single receiver in a field experiment. A second simulated data trace 308b represents simulated data (also at 2.5 Hz) from the forward modeling process 104 (FIG. 1) that is intended to correspond to the actual data represented by the second actual data trace 306b.

A potential problem in using average misfit to determine the desirability of performing subsequent rounds of inversion is that the average misfit data illustrated in FIG. 2 may be based on thousands of individual elements of data, such as the first actual data trace 306a and the second actual data trace 306b. Moreover, the sheer volume of data elements in the data domain 106 (FIG. 1) may make it impractical to perform an element-by-element analysis of misfit. For the example of CSEM data, a user would need to individually evaluate the misfit for thousands of combinations of source line, receiver and frequency data obtained during a data gathering operation. The evaluation of misfit information in this manner may not be realistically feasible. Thus, average misfit is typically used even though it does not convey detailed information about the quality of the fit on a region by region basis. The use of average misfit makes decisions regarding whether subsequent inversion rounds might significantly reduce the misfit more speculative.

The following example illustrates potential inaccuracies caused by the use of average misfit. A particular set of data elements in the data domain 106 (FIG. 1) may result from defective collection equipment, such as a non-functioning receiver. Using average misfit data to determine whether subsequent refinement of the information in the model domain 102 would be helpful would hide the effect of the data corresponding to the defective collection equipment. Thus, a user could remain unaware of related inaccuracies represented in the model domain 102 (FIG. 1) and/or the data domain 106 (FIG. 1).

There are several known methods of transforming data related to physical property models. U.S. Pat. No. 7,333,893 describes a method for removing effects of shallow resistivity structures in electromagnetic survey data to produce a low frequency resistivity anomaly map, or alternatively imaging resistivity structures at their correct depth levels. The method involves solving Maxwell's electromagnetic field equations by either forward modeling or inversion, and uses at least two survey data sets, one taken at the source frequency selected to penetrate to a target depth, the other a higher frequency that penetrates shallow depths.

U.S. Pat. No. 7,418,350 describes a method and apparatus for estimating a seismic velocity field from seismic data including time-amplitude representations associated with source-receiver locations spaced apart by an offset distance and having a midpoint therebetween. The seismic data may be arranged into common midpoint (CMP) gathers associated with respective CMP locations. A control plane having an edge intersecting a plurality of the CMP locations is defined, an initial velocity field for the control plane is produced, the initial velocity field including a plurality of time-velocity values for each of the CMP locations; and an optimized velocity field for the control plane is produced by adjusting the time-velocity values for each of the CMP locations in response to trends, relative to offset distance, in time values, associated with common seismic events, until said optimized velocity field satisfies a condition.

U.S. Patent Application Publication No. 20060197534 describes a method for enhancing resistive anomalies in electromagnetic geophysical survey data. Scaled values of a measured electromagnetic field parameter are plotted on a depth section at locations related to corresponding source/receiver locations. Scaling is performed relative to a reference signal selected to represent a baseline free of unknown resistive bodies. Scaled values are represented by a color scale in the display, and the color scale may be adjusted to enhance perceived anomalies. The method may be employed in either the frequency domain or the time domain.

U.S. Patent Application Publication No. 20090006053 describes a method for efficient processing of controlled source electromagnetic data, whereby Maxwell's equations are solved by numerical techniques such as finite difference or finite element in three dimensions for each source location and frequency of interest. The Reciprocity Principle is used to reduce the number of computational source positions, and a multi-grid is used for the computational grid to minimize the total number of cells yet properly treat the source singularity, which is essential to satisfying the conditions required for applicability of the Reciprocity Principle. An initial global resistivity model is Fourier interpolated to the computational multi grids. In systems that perform inversion, Fourier prolongation is used to update the global resistivity model based on optimization results from the multi-grids.

International Patent Application Publication No. WO2007145694 describes a method for updating a velocity model for migrating seismic data using migration velocity scans with the objective of building a model that reproduces the same travel times that produced selected optimal images from a scan. For each optimal pick location in the corresponding test velocity model, a corresponding location is determined in the velocity model to be updated, using a criterion that the travel time to the surface for a zero offset ray should be the same. Imaging travel times are then computed from the determined location to various surface locations in the update model, and those times are compared to travel times in the test velocity model from the optimal pick location to the same array of surface locations. The updating process consists of adjusting the model to minimize the travel time differences.

International Patent Application Publication No. WO2008042081 describes a method for reducing the time needed to perform geophysical inversion by using simultaneous encoded sources in the simulation steps of the inversion process. The geophysical survey data are prepared by encoding a group of source gathers, using for each gather a different encoding signature selected from a set of non-equivalent encoding signatures. Then, the encoded gathers are summed by summing all traces corresponding to the same receiver from each gather, resulting in a simultaneous encoded gather. Alternatively, the geophysical data are acquired from simultaneously encoded sources. The simulation steps needed for inversion are then calculated using a particular assumed velocity (or other physical property) model and simultaneously activated encoded sources using the same encoding scheme used on the measured data. The result is an updated physical properties model that may be further updated by additional iterations.

International Patent Application Publication No. WO2008066628 describes a method for organizing computer operations on a system of parallel processors to invert electromagnetic field data from a controlled-source electromagnetic survey of a subsurface region to estimate resistivity structure within the subsurface region. Each data processor in a bank of processors simultaneously solves Maxwell's equations for its assigned geometrical subset of the data volume. Other computer banks are simultaneously doing the same thing for data associated with a different source frequency, position or orientation, providing a 'fourth dimension' parallelism, where the fourth dimension requires minimal data passing. A time limit may be set after which all processor calculations are terminated, whether or not convergence has been reached.

Known methods of improving physical property models do not permit efficient comparison of the misfit between simulated data and known data. An improved system and method for providing such an efficient comparison is desirable.

SUMMARY

An exemplary embodiment of the present techniques comprises a method for creating a physical property model representative of a physical property of a region. An exemplary method comprises transforming information from a model domain that represents the physical property model into simulated data in a data domain, the data domain comprising simulated data and measured data representative of a plurality of observations of the region. An areal misfit between the simulated data and the measured data representative of the plurality of observations of the region is determined. An evaluation of the areal misfit is performed based on known criteria. The exemplary method comprises adjusting data in the data domain or information in the model domain corresponding to a region in the model domain based on the evaluation of the areal misfit.

A visual representation of the areal misfit including misfit values for each of a plurality of data elements may be provided. Each of the plurality of data elements may correspond to an observation of the region. A visual representation of information in the model domain may also be provided.

The data model may comprise controlled source electromagnetic (CSEM) data or seismic data. A subsequent transformation step may be performed using a result of the adjusting step as input. In addition, a visualization that expresses data density may be provided. Areal misfit may be displayed using variations in color to correspond to variations in the misfit. In an exemplary embodiment of the present techniques, the known criteria are based on geologic knowledge.

One exemplary embodiment of the present techniques relates to a method for producing hydrocarbons from an oil and/or gas field using a physical property model representative of a physical property of the oil and/or gas field. An exemplary method comprises transforming information from a model domain that represents the physical property model of the oil and/or gas field into simulated data in a data domain, the data domain comprising simulated data and measured data representative of a plurality of observations of a region of the oil and/or gas field. The exemplary method also comprises determining an areal misfit between the simulated data and the measured data representative of the plurality of observations of the region of the oil and/or gas field. An evaluation of the areal misfit is performed based on known criteria. The exemplary method comprises adjusting data in the data domain or information in the model domain corresponding to a region in the model domain based on the evaluation of the areal misfit. Hydrocarbons are extracted from the oil and/or gas field based on a physical property model that results from the adjustment of the data in the data domain or the information in the model domain.

A visual representation of the areal misfit including misfit values for each of a plurality of data elements may be provided. Each of the plurality of data elements may correspond to an observation of the region. A visual representation of information in the model domain may also be provided.

In an exemplary method of producing hydrocarbons, the data model may comprise controlled source electromagnetic (CSEM) data or seismic data. A subsequent transformation step may be performed using a result of the adjusting step as input. In addition, a visualization that expresses data density may be provided. Areal misfit may be displayed using variations in color to correspond to variations in the misfit. In an exemplary embodiment of the present techniques, the known criteria are based on geologic knowledge.

An exemplary embodiment of the present techniques relates to a computer system that is adapted to create a physical property model representative of a physical property. One exemplary computer system comprises a processor and a tangible, machine-readable storage medium that stores machine-readable instructions for execution by the processor. The machine-readable instructions comprise code that, when executed by the processor, is adapted to cause the processor to transform information from a model domain that represents the physical property model into simulated data in a data domain, the data domain comprising simulated data and measured data representative of a plurality of observations of a region. The machine-readable instructions also comprise code that, when executed by the processor, is adapted to cause the processor to determine an areal misfit between the simulated data and the measured data representative of the plurality of observations of the region. The machine-readable instructions additionally comprise code that, when executed by the processor, is adapted to cause the processor to perform an evaluation of the areal misfit based on known criteria. The machine-readable instructions comprise code that, when executed by the processor, is adapted to cause the processor to adjust data in the data domain or information in the model domain corresponding to a region in the model domain based on the evaluation of the areal misfit.

The machine-readable instructions may comprise code that, when executed by the processor, is adapted to cause the processor to provide a visual representation of the areal misfit including misfit values for each of a plurality of data elements. Each of the plurality of data elements may correspond to an observation of the region.

DESCRIPTION OF THE DRAWINGS

Advantages of the present techniques may become apparent upon reviewing the following detailed description and drawings of non-limiting examples of embodiments in which:

FIG. 6 is a block diagram showing a main menu panel produced by a computer program according to an exemplary embodiment of the present techniques;

Figure 1:
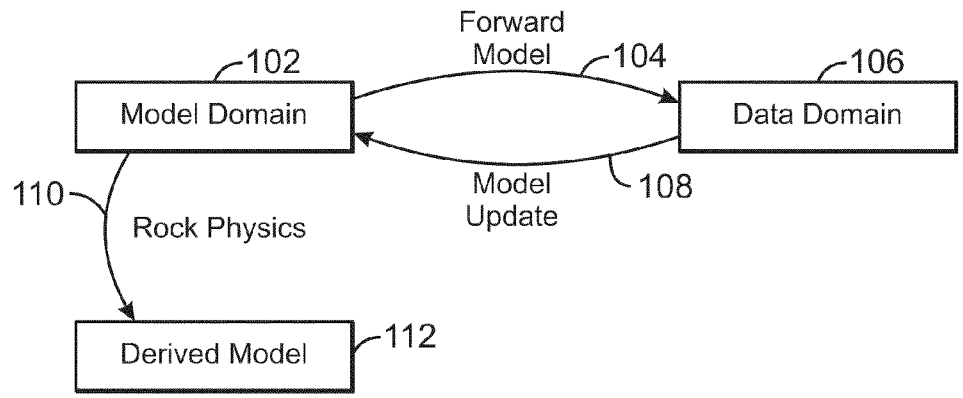
FIG. 1 is a block diagram that is useful in explaining the improvement of the accuracy of information in a model domain through one or more cycles of forward modeling and model updates.
Figure 2:
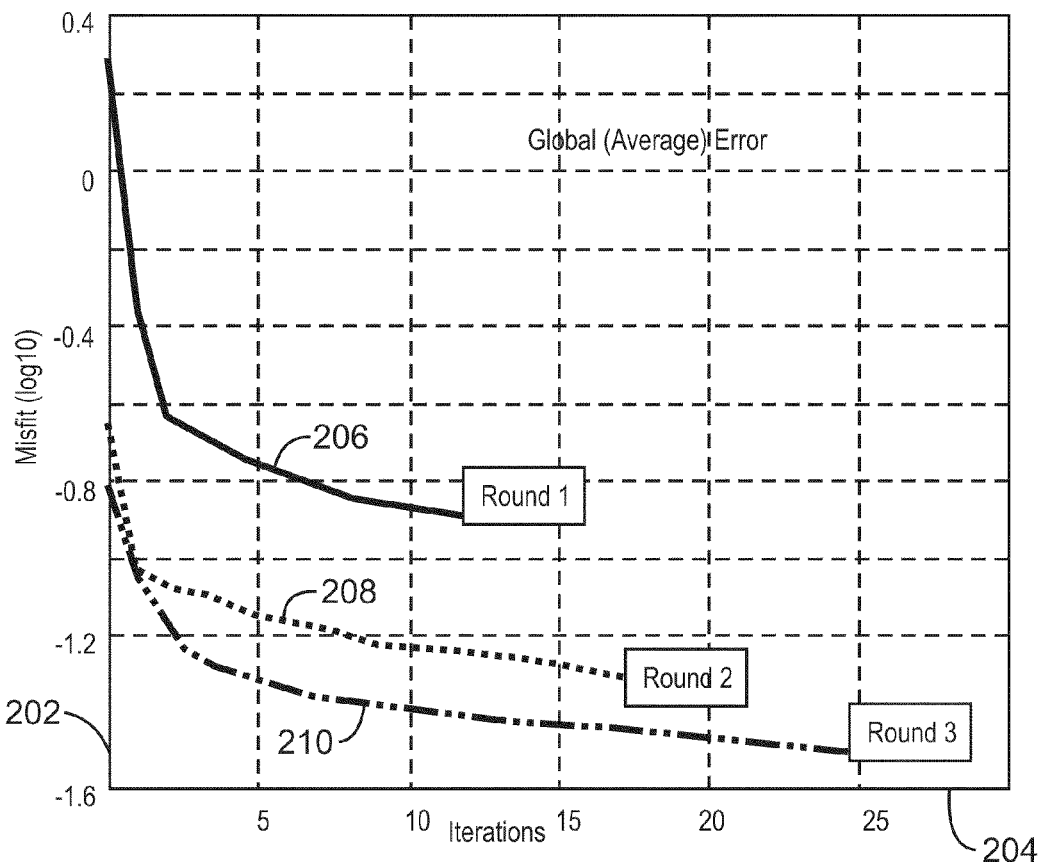
FIG. 2 is graph that is useful in explaining a known technique of using a global or average error to improve the accuracy of a physical property model.
Figure 3:
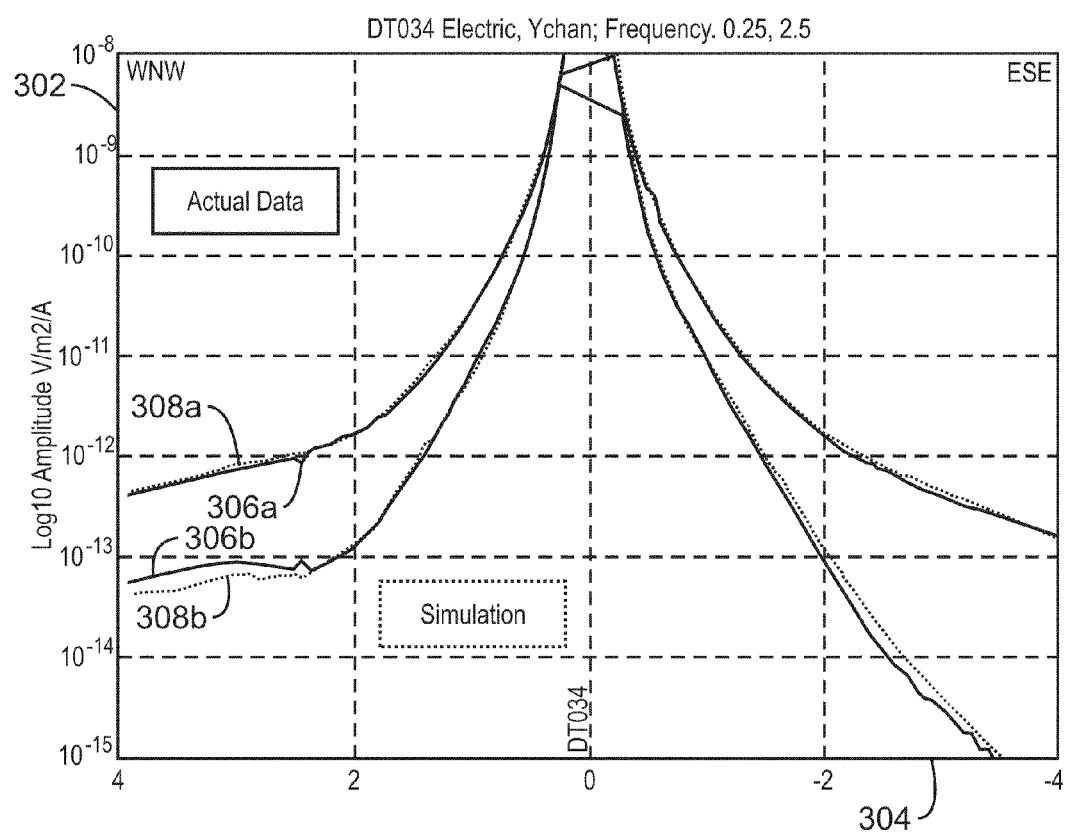
FIG. 3 is a graph that shows a degree of misfit between actual data and simulated data for individual elements of information.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent.

As used herein, "boundaries" refer to locations of changes in the properties of subsurface rocks, which typically occur between geologic formations.

As used herein, the term "model domain" refers to a set of information describing a physical property model of a region. Information in the model domain may be produced by performing an inversion on data in the data domain. Examples of properties that may be represented in the model domain include resistivity and seismic impedance.

As used herein, the term "data domain" refers to a representation of observed data and/or simulated data produced by performing a forward modeling process on information in the model domain. Examples of properties that may be represented in the data domain include CSEM data, seismic data, MT data or the like.

As used herein, the terms "controlled source electromagnetic" or "CSEM" refer to methods that employ electromagnetic (EM) transmitters, called sources, as energy sources, and the receivers measure the responses of the geological structures to the transmitted signals. The transmitter may be a direct current (DC) source, which injects a DC current into the geological formations. DC currents are typically injected into the formations using contacting electrodes. Recent EM measurement methods use EM sources that produce time-varying electrical and/or magnetic fields. The EM fields may be a pulse-generated by turning on and off an EM transmitter, and in this case, the receivers effectively measure a pulse response of the geological structures. EM measurements may use a transmitter that transmits a fixed frequency or a range of frequencies. The higher frequency EM sources permit resolution of finer structures, whereas the lower frequency EM sources allow one to probe deeper into the formations.

As used herein, the terms "forward modeling" or "forward modeling process" refer to a mathematical modeling process in which a synthetic data model is predicted by transforming an input property model based on theory.

As used herein, the term "geological layers" refers to layers of the subsurface (e.g., the Earth's subsurface) that are disposed between geologic formation tops, each of which produce seismic reflections subsequently mapped by interpreters as seismic horizons.

As used herein, "geological scenarios" are models that represent the properties of the geological layers in the subsurface. The scenarios may be based on well log data, expected properties for the area, or properties taken from similar fields.

As used herein, "horizons" or "seismic horizons" are mechanically marked boundaries in the subsurface structures that are deemed important by an interpreter. Marking these boundaries is done by interpreters when they interpret seismic volumes by drawing lines on a seismic section. Each line represents the presence of an interpreted surface at that location. An interpretation project typically generates several dozen and sometimes hundreds of horizons.

As used herein, "impedance" is the product of seismic velocity and the density. Impedance typically varies among different rock layers, e.g., opposing sides of an interface have different impedances. Two types of impedance terms are generally defined, $I_p$ and $I_s$, wherein $I_p$ is P-wave impedance, also called acoustic impedance, and $I_s$ S-wave impedance. The reflection coefficient of an interface generally depends on the contrast in the velocities and densities of the rock on either side of the interface. Specifically, the contrast in these properties of geological layers affects the reflection coefficient at the boundary separating the two layers. One geophysical process for determining the velocity and/or the density structure of a subsurface region based on recorded seismic reflection data is seismic inversion.

As used herein, an "interface" is an edge of a geologic model and/or a boundary of a volumetric region of the geologic model. Interfaces may separate regions having contrasting flow properties, and/or behave as a barrier or conduit to flow. Interfaces can separate regions that include but are not limited to stratigraphic regions, such as sequences or parasequences, facies regions, such as shale layers or individual channels, petrophysical and/or diagenetic regions, such as cemented, porous or fractured regions, and structural regions, such as fault blocks.

As used herein, the term "inversion" refers to a process by which one attempts to find a model of one or more properties that reproduce the measured response of data such as CSEM data or seismic data within a tolerance and satisfies geological and geophysical constraints. There are a large number of well-known methods of inversion. These well-known methods fall into one of two categories, iterative inversion and non-iterative inversion. Non-iterative inversion is accomplished by assuming some simple background model and updating the model based on the input data. In comparison, iterative inversion uses the updated model as input to another step of inversion. Moreover, an inversion process may refer to the iterative process of using forward modeling to transform information from the model domain into the data domain and using misfit to adjust either information in the model domain or data in the data domain so that a physical property model in the model domain more closely approximates an actual region.

As used herein, the term "magnetotelluric (MT) analysis" refers to an established technique that uses measurements of naturally occurring electromagnetic fields to determine the electrical resistivity, or conductivity, of subsurface rocks. An MT survey employs time series measurements of orthogonal components of the electric and magnetic fields, which define a surface impedance. This impedance, observed over a broad band of frequencies and over the surface, determines the electrical conductivity distribution beneath that surface, with horizontal layers of the earth being mathematically analogous to segments of a transmission line. Factors affecting the resistivity of subsurface materials include temperature, pressure, saturation with fluids, structure, texture, composition and electrochemical parameters. Resistivity information may be used to map major stratigraphic units, determine relative porosity or support a geological interpretation. A significant application of MT surveying is oil exploration. An MT survey may be performed in addition to seismic, gravity and magnetic data surveys. A combination of data from two or more different survey methods leads to a more complete understanding of subsurface structure than may be possible through the use of any single technique alone, particularly where the structure is such that measurement using a given technique may be contraindicated.

As used herein, the term "misfit" refers to some scaled difference between observed or measured data and forward modeled data (synthetic data) in the data domain. Misfit may be the most recent model update or may be the current model value for the iteration, to name just a few examples. The misfit may be posted where the update occurs or may be approximately posted using, for example, a source-receiver midpoint.

As used herein, the term "property" refers to a characteristic associated with different topological elements on a per element basis.

As used herein, "receivers" are devices that are adapted to receive signals transmitted as part of a data gathering process. For example, seismic receivers are adapted to receive transmitted seismic signals and EM receivers are adapted to receive transmitted EM signals. Receivers may be used to collect observed data that may be stored in the data domain.

As used herein, the term "seismic data" refers to information collected by creating seismic waves with sources of seismic energy and observing the arrival times and amplitudes of the waves reflected from interfaces with contrasting acoustic velocity and/or bulk density or refracted through high-velocity intervals. These data are processed using procedures such as filtering, removing of multiples, muting, stacking, and migration.

As used herein, the terms "volume," "data volume," or "seismic volume" are synonymous and refer to particular seismic data defined at locations in a three dimensional (3-D) representation of seismic data. Thus, data may be represented as a multi-dimensional matrix of values, wherein three coordinates are used to represent the 3-D location of a particular data volume in time and space (e.g., x, y, and t) and numerous additional terms may be used to represent specific physical attributes associated with the volume, such as impedance, velocity, density, seismic attributes, and the like.

As used herein, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and/or a computer. One or more computer components can reside within a process and/or thread of execution and a computer component can be localized on one computer and/or distributed between two or more computers.

As used herein, "tangible machine-readable medium" refers to a medium that participates in directly or indirectly providing signals, instructions and/or data to a processing system. A machine-readable medium may take forms, including, but not limited to, non-volatile media (e.g. ROM, disk) and volatile media (RAM). Common forms of a machine-readable medium include, but are not limited to, a floppy disk, a flexible disk, a hard disk, a magnetic tape, other magnetic medium, a CD-ROM, other optical medium, punch cards, paper tape, other physical medium with patterns of holes, a RAM, a ROM, an EPROM, a FLASH-EPROM, or other memory chip or card, a memory stick, and other media from which a computer, a processor or other electronic device can read.

Some portions of the detailed description which follows are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions using the terms such as "providing", "transforming", "determining", "performing", "adjusting", "defining", "selecting", "displaying", "limiting", "processing", "computing", "obtaining", "predicting", "producing", "updating", "comparing" or the like, refer to the action and processes of a computer system, or similar electronic computing device, that transforms data represented as physical (electronic) quantities within the computer system's registers and memories into other data similarly represented as physical quantities within the computer system memories or registers or other such information storage, transmission or display devices. Example methods may be better appreciated with reference to flow diagrams.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, it is to be appreciated that various actions could occur concurrently, substantially in parallel, and/or at substantially different points in time.

Exemplary embodiments of the present techniques allow a user to effectively control the development of a physical property model representative of a property of interest by interpreting misfit that represents a difference between synthetic forward-modeled data and actual, observed data for the property of interest as iterations of an inversion process are performed. The analysis of the misfit allows the user to adjust information in the model domain or data in the data domain so that the misfit is reduced during subsequent iterations of the inversion process. In this manner, exemplary embodiments of the present techniques allow the user to more easily and quickly arrive at an acceptable physical property model for a property of interest.

Physical property models produced in accordance with an exemplary embodiment of the present technique may allow the preparation of useful visualizations of model domain information. Examples of subsurface features for which visualizations may be prepared include boundaries, geologic layers, geological scenario data and/or interfaces.

Figure 4:
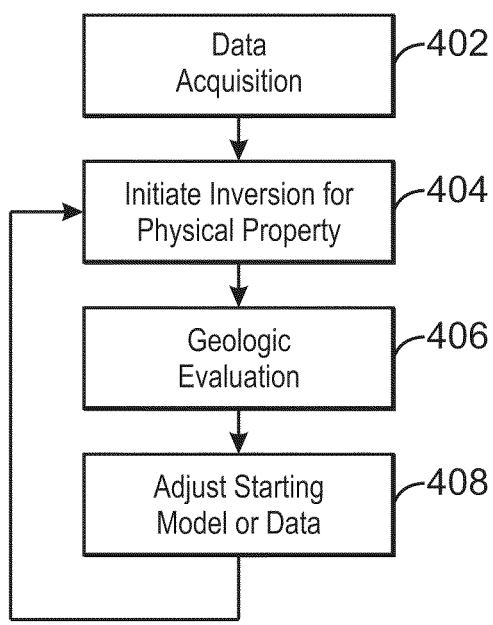
FIG. 4 is a process flow diagram of a process of providing a physical property model according to an exemplary embodiment of the present techniques.

FIG. 4 is a process flow diagram of a process of providing a physical property model according to an exemplary embodiment of the present techniques. The process is generally referred to by the reference number 400. At block 402, data is acquired. The data may relate to a wide range of physical properties of interest. As set forth herein, examples of data that may be acquired include CSEM data, seismic data, MT data or the like.

At block 404, an inversion process is initiated to transform the data acquired at block 402 from the data domain 106 (FIG. 1) into the model domain 102 (FIG. 1). As set forth herein, the inversion process may include multiple rounds of inversion. In addition, the inversion process may also include the transformation of information from the model domain 102 (FIG. 1) to the data domain 106 (FIG. 1) via the forward modeling process 104 (FIG. 1).

At the end of a round of inversion, a geologic evaluation is performed, as shown at block 406. The geologic evaluation 406 may comprise a misfit evaluation according to an exemplary embodiment of the present techniques. Moreover, the geologic evaluation 406 may employ expert analysis of a visualization of misfit information as described herein. Block 408 represents an adjustment process that may be performed on information in the model domain 102 (FIG. 1), data in the data domain 106 (FIG. 1) or both based on the geologic evaluation 406. After the adjustment process 408, a subsequent round of inversion may begin, as indicated by the arrow from the adjustment process 408 to the initiation of an inversion at block 404.

Figure 5:
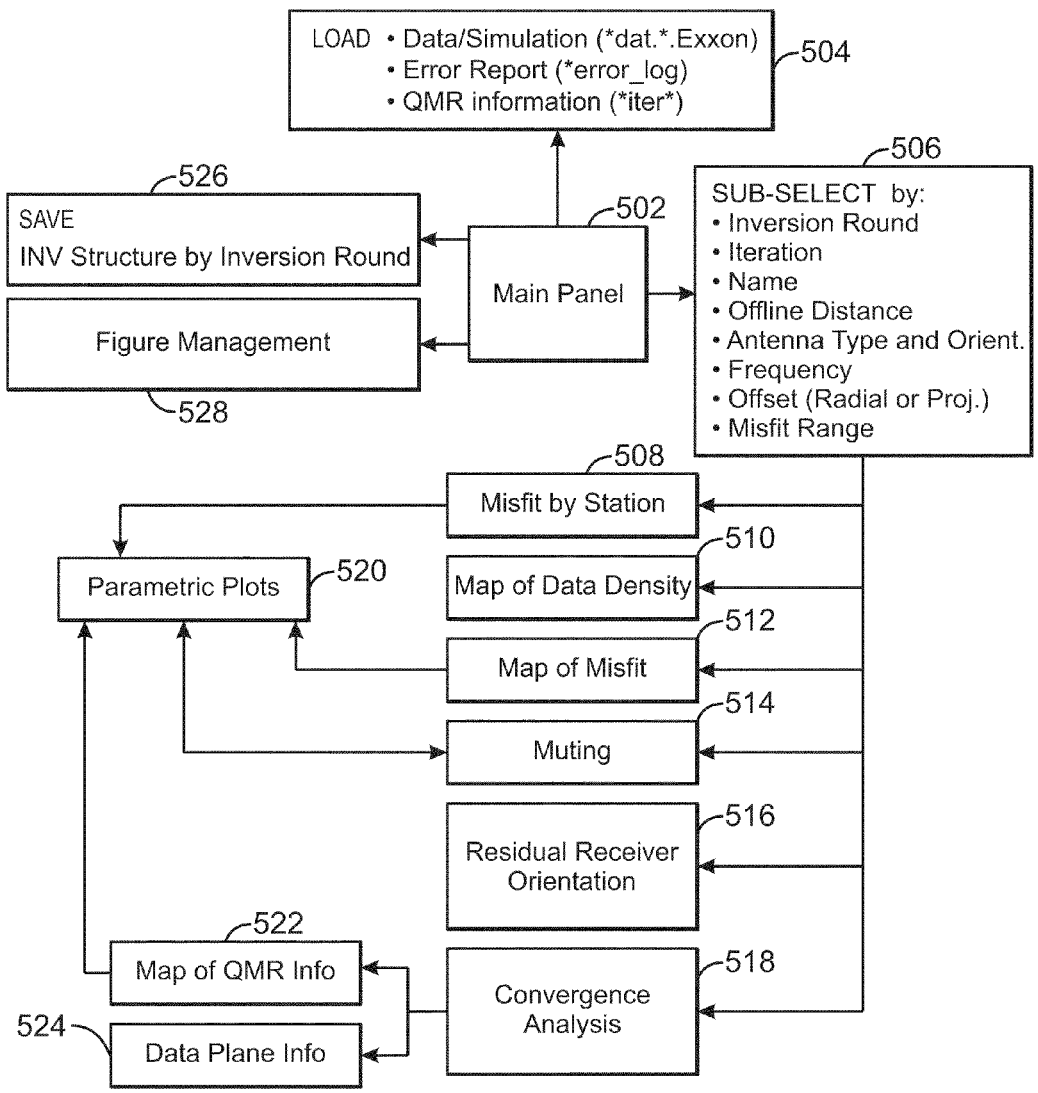
FIG. 5 is a block diagram showing functional blocks of a computer program according to an exemplary embodiment of the present techniques.

FIG. 5 is a block diagram showing functional blocks of a computer program according to an exemplary embodiment of the present techniques. The computer program is generally referred to by the reference number 500. The computer program 500 may be used to assist in the performance of the geologic evaluation 406, as described herein with reference to FIG. 4. Moreover, the computer program 500 may comprise a set of tools that allow analysis of misfit between simulated data and known data in the data domain 106 (FIG. 1). Based on expert knowledge and/or other a priori criteria, a user may be able to perform the adjustment process 408 (FIG. 4) in a manner that more rapidly reduces the overall cost of the inversion process.

The computer program 500 may be adapted to display a main panel, which may be produced by a main panel module 502. As described below with reference to FIG. 6, the main panel provided by the main panel module 502 may provide a range of options that a user may use to create a data model according to an exemplary embodiment of the present techniques. Examples of functions that may be provided include the ability to efficiently load and manipulate actual data fields and the synthetic fields resulting from inversion and the ability to sub-select part of the data based on field type, frequency, line-receiver respective geometries, and misfit value.

Misfit information regarding selected points may be statistically analyzed and/or gridded to produce a map that represents an areal visualization of the quality of fit between synthetic data produced by forward modeling and actual known data (for locations where actual data is available). Areal visualizations of misfit may be used to identify a particular location for which adjustment of physical property model information or corresponding data in the data domain may yield a reduction in misfit. In addition, visualizations of misfit may be based on data density. Fit improvement between iterations of the same round of inversion or between different rounds of inversion may be mapped. Areal data coverage may be estimated. In addition, parametric plots may be displayed to allow a user to identify and mute or hide points that do not represent valid data on an individual basis.

A computer program according to an exemplary embodiment of the present techniques permits effective monitoring of the process of producing a physical property model via a multi-iteration inversion process. In so doing, a user may stop the inversion process after any iteration and examine the misfit at that point in the process on an areal basis relative to a region of interest. Areas of the region with large misfit or large updates may be indicative of an inaccuracy in the initial model, which may be addressed before further iterations are performed.

In contrast to known methods, misfit is available at a plurality of locations within the region of interest. Moreover, the adjustment process 408 (FIG. 4) may be performed on individual records of data in the data domain before subsequent iterations are performed. This allows the user to perform adjustment of data only for physical locations where the misfit is unacceptably large, as opposed to making broad changes that may not make forward modeling more accurate for all areas of interest. The ability to select and evaluate data or corresponding model information at this level of granularity provides the user with the ability to exercise significant control over subsequent rounds of inversion.

A wide range of techniques may be used to adjust data in the data domain. Examples of criteria that may be used to adjust data to achieve better fit (reduced misfit) of synthetic data relative to known data in the data domain include known behavioral properties of geologic structures, expert knowledge or prediction. Using one or more of these techniques, it may be possible to identify and exclude bad data by discovering irregular, large areas of misfit that may result from, for example, defective data collection equipment.

Bad data may also be fixed, for example, by adjusting data domain information so that the simulated data more accurately matches the acquired data. Examples of adjustments that may be made to data domain information include adjusting receiver rotation or phase errors in collected CSEM data based on misfit results.

The exemplary computer program represented in FIG. 5 includes a load module 504 that may be accessed by the main panel. The load module 504 may allow a user to load a variety of data types, including simulation model data, error reports, quasi-minimal residual (QMR) information or the like.

A sub-selection module 506 may allow a user to further identify data or functions to be performed on data. Examples of items that may be chosen from the sub-selection module 506 include inversion round, iteration, iteration name, offline distance, antenna type and orientation, frequency, offset (radial or projected), misfit range or the like.

According to an exemplary embodiment of the present techniques, a round of inversion corresponds to a unique set of actual input data and a unique starting model. If an inversion is restarted after a node failure with no change to the input data, the next iteration and subsequent iterations belong to the same round of inversion.

In addition, the sub-selection module 506 may provide access to other program modules. In the exemplary embodiment shown in FIG. 5, the sub-selection module 506 allows the user to access a misfit by station module 508, a map of data density module 510, a map of misfit module 512, a muting module 514, a residual receiver orientation module 516 and a convergence analysis module 518.

As shown in FIG. 5, a parametric plots module 520 is accessible from several other modules. For example, the parametric plots module 520 may be accessed via the misfit by station module 508, the map of misfit module 512 or the muting module 514. The muting module 514 may also be accessed from the parametric plots module 520.

The convergence analysis module 518 may provide access to a map of QMR information module 522 and a data plane information module 524. In the exemplary embodiment shown in FIG. 5, the map of QMR information module 522 provides access to the parametric plots module 520.

The main panel provided by the main panel module 502 may additionally provide access to other modules that provide functionality to a user. For example, the main panel module 502 may provide access to a save module 526, which may allow the user to save various types of data. The main panel module 502 may also provide access to a figure management module 528, which may allow a user to manipulate visualizations created by one more of the other modules of the computer program 500.

Figure 6:
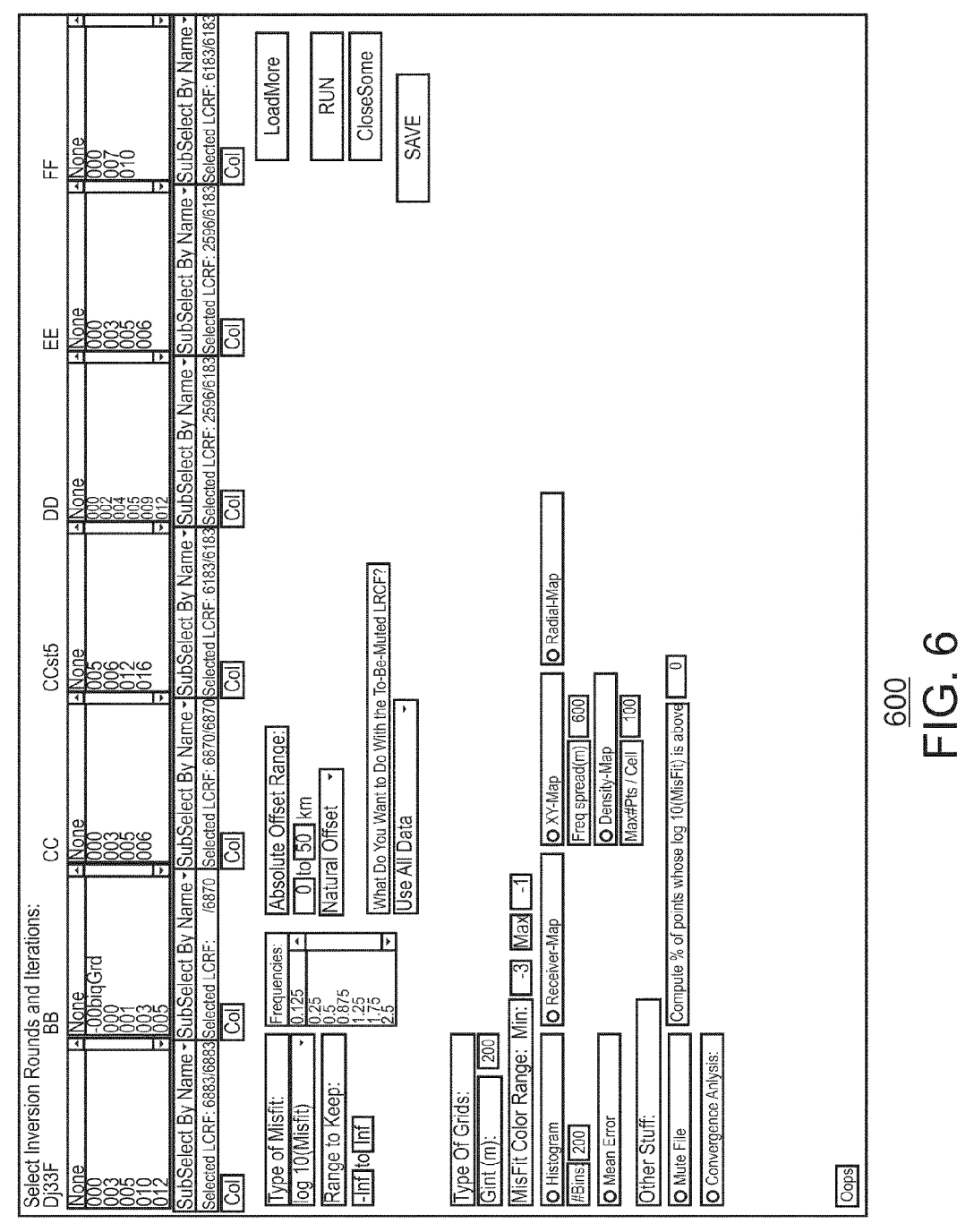

FIG. 6 is a block diagram showing a main menu panel produced by a computer program according to an exemplary embodiment of the present techniques. The main menu panel is generally referred to by the reference number 600. The main menu panel 600 is an exemplary embodiment of a main menu panel that may be produced by the main panel module 502 (FIG. 5). Those of ordinary skill in the art will appreciate that the main menu panel 600 may allow a user to access a wide range of functionality provided by the various modules described herein with reference to FIG. 5.

For example, the main menu panel 600 may allow a user to sub-select iteration rounds by name. The user may additionally select a type of misfit, a range to keep, frequencies of interest, an absolute offset range and a natural offset range, to name just a few examples.

Other selections provided in the exemplary main menu panel 600 include selections relating to how to treat data that is muted or hidden. Additionally, buttons may be provided to allow the user to access the load module 504 and the save module 126. A user may choose to run one or more iterations to provide synthetic data through a forward-modeling algorithm. For example, the load module 504 (FIG. 5) may allow the user to open an update/load inversion rounds panel. A list function may display the existing rounds of inversion. Data may be added to selected rounds of inversion. A new round of inversion may be added by providing a name for the new round. As fully described herein, the functions provided by the main menu panel 600 allow the user to analyze effectively the misfit between synthetic data created by forward modeling during one or more iterations of an inversion process and actual (for example, measured) data in the data domain.

Figure 7:
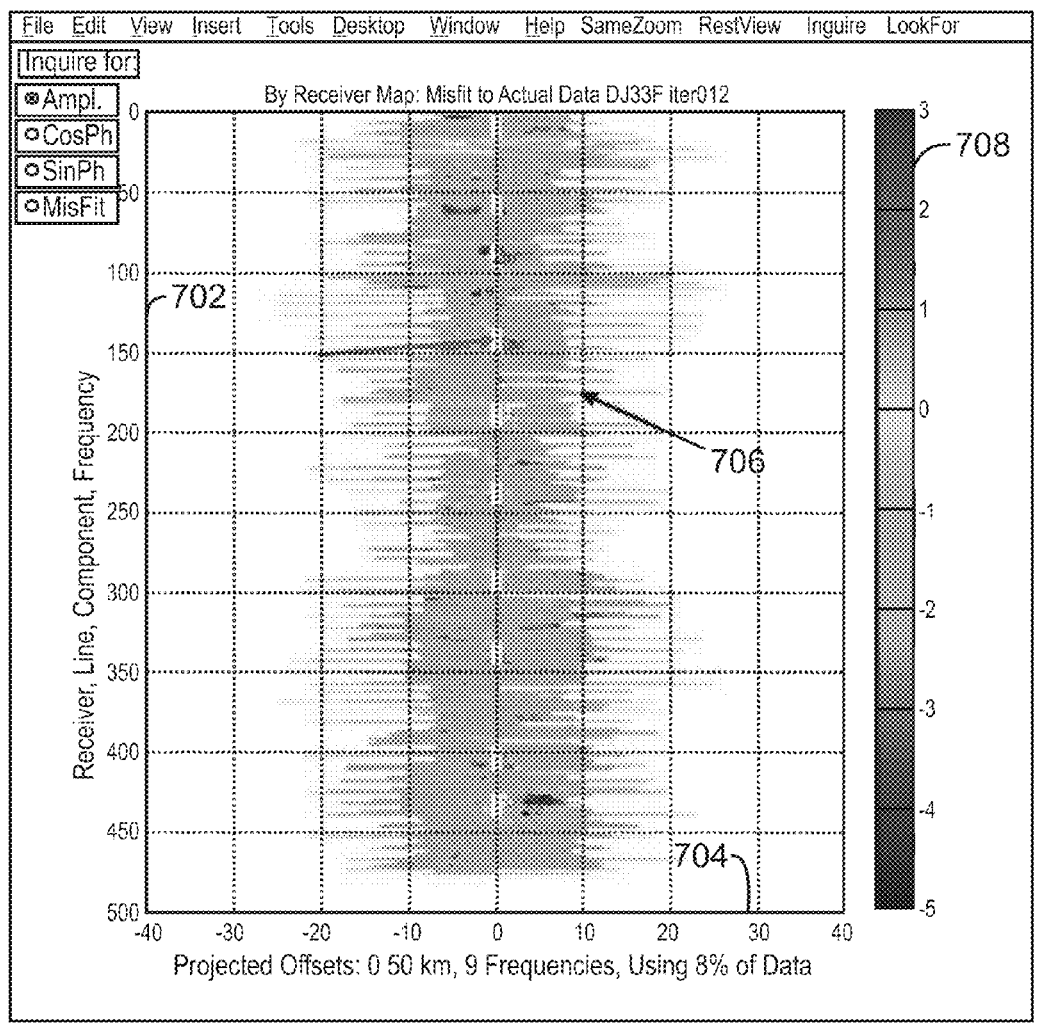
FIG. 7 is a graph showing a visualization of misfit for station gather data according to an exemplary embodiment of the present techniques.

FIG. 7 is a graph showing a visualization of misfit for station gather data according to an exemplary embodiment of the present techniques. The graph is generally referred to by the reference number 700. The graph 700 represents a visualization of misfit of synthetic data produced by the forward modeling process 104 (FIG. 1) relative to actual data in the data domain. A y-axis 702 represents data for individual receivers, lines, components and/or frequencies. An x-axis 704 represents distance in units of kilometers. Several traces 706 represent the misfit of synthetic data relative to known data for a plurality of receivers obtained during a data gathering process.

According to exemplary embodiments of the present techniques, each piece of data (station) may be uniquely identified in the graph 700 by the receiver name, the tow line name (or MT), the antenna (or coil) type (horizontal X or Y, vertical), the field type (electric or magnetic) and the frequency. Each station is typically composed of many data points corresponding to transmitter positions. As set forth herein, data may be organized by round of inversion. In this way, all of the iterations corresponding to the same round of inversion can be stored together without repeating the redundant receiver/tow line geometrical information.

In FIG. 7, a legend 708 defines a color spectrum corresponding to misfit values for the traces 706. According to an exemplary embodiment of the present techniques, the color of the individual traces represents a corresponding level of misfit. In this manner, data having the greatest degree of misfit can be easily identified on a per receiver basis. The data in the data domain may be adjusted so that successive iterations produce less misfit with respect to known data. In addition, expert knowledge or other a priori information may be used to make adjustments to model domain information corresponding to data for which misfit is unacceptably large.

Data from multiple receivers may be binned and displayed as a single one of the traces 706. For example, offsets may be binned by $G_{int}$. Data for particular ranges of misfit values may be emphasized (for example, shown with additional color saturation). In addition, data for particular ranges of misfit values may be muted or hidden.

Using an input screen such as the main menu panel 600 (FIG. 6), an interactive menu such as a gather window may be adapted to permit the selection and display of the amplitude, phase and misfit of actual and synthetic data corresponding to individual stations (parametric plots). According to an exemplary embodiment of the present techniques, data having the best and worst fits may be easily identified, to allow adjustment of the corresponding input data for the worst fits. A user may select several rounds of inversion and their corresponding iterations. The user can sub-select data by receiver, line, field type, component, receiver antenna orientation with respect to tow-line, frequency, offset and misfit range. Then, analysis can be performed on the selected data.

A wide range of analytical functionality may be incorporated into a computer program according to exemplary embodiments of the present techniques. In one exemplary embodiment, a "histogram" function may provide a visualization that includes histograms corresponding to misfit for the selected data. An "inquire" function may be adapted to allow a user to interactively select a receiver and to display parametric plots of amplitude, cosine or sine of phase, misfit or the like. A "look for" function may be adapted to list one or more selected receivers. Data for listed receivers may be sorted by line, receiver, component, distance between each receiver and tow line (offset distance) and angle (first quadrant) between the receiver antenna and the tow line. Corresponding parametric plots may be displayed according to types defined on a receiver-map plot such as the graph 800 for the frequencies selected from a menu having a particular type and offset. A "same zoom" function may be adapted to set minimum and maximum x-axis and y-axis values of other receiver maps to the value of a current receiver map. A "reset view" function may be adapted to reset a receiver map view to an original or default display.

Figure 8:
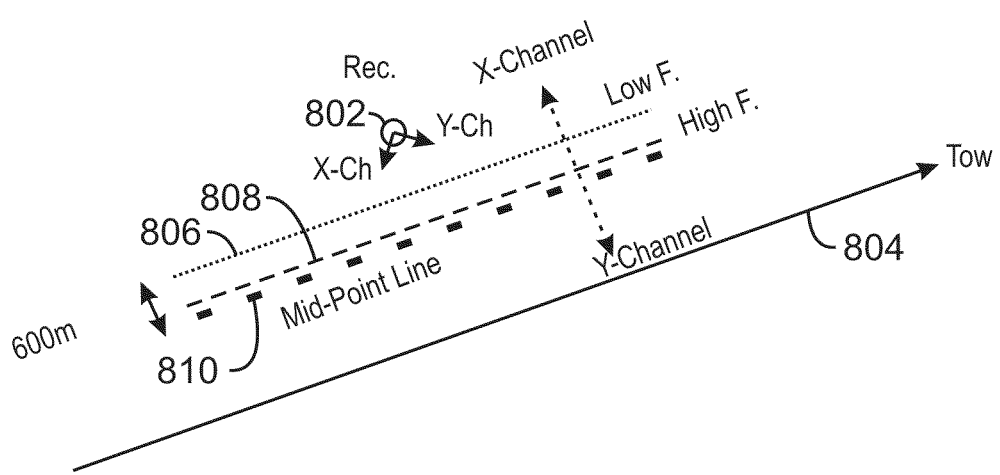
FIG. 8 is a diagram that is useful in explaining the collection of data that may be used to provide a physical property model according to an exemplary embodiment of the present techniques.

FIG. 8 is a diagram that is useful in explaining the collection of data that may be used to provide a data model according to an exemplary embodiment of the present techniques. The diagram is generally referred to by the reference number 800. The diagram 800 may also be used to explain an exemplary placement of the traces 706 shown in FIG. 7.

As set forth above, CSEM data is gathered by receivers in response to energy transmitted from an EM source. FIG. 8 depicts the use of an exemplary stationary receiver 802 to receive signals resulting from an EM source towed by a boat or other water craft. The path of the towing vehicle is indicated by a tow line 804.

With regard to an exemplary embodiment of the present techniques, the main menu panel 600 (FIG. 6) may be adapted to control the presentation of an X,Y position grid on a visualization of misfit data collected as shown in FIG. 8 as it is analyzed through multiple iterations of an inversion process. A grid interval to be used in creating a visualization may be defined by the user.

In general, CSEM misfit cannot be gridded without transformation, because all data points from different receivers and different frequencies corresponding to one tow line have the same X,Y coordinates (the location of the receiver). Thus, the X,Y coordinates of the data are transformed to correspond to the transmitter locations. In performing the transformation, each data point is moved to the mid-point between the corresponding receiver and the corresponding transmitter location. In FIG. 8, this mid-point is shown as a mid-point line 810. Data points are then moved perpendicularly to the direction of the tow line 804 according to the corresponding frequency. Relatively higher frequencies are positioned closer to the mid-point line 810 (as shown by a high frequency reference line 808). Relatively lower frequency data is moved farther away to a maximum distance defined by the user (as shown by a low frequency reference line 806). By convention, a first horizontal receiver (EX, also called X-channel) is moved to port and a second horizontal receiver (EY, also called Y-channel) is moved starboard. This convention may be used to determine the placement of the traces 706 (FIG. 7) relative to the x-axis 704 (FIG. 7).

Figure 9:
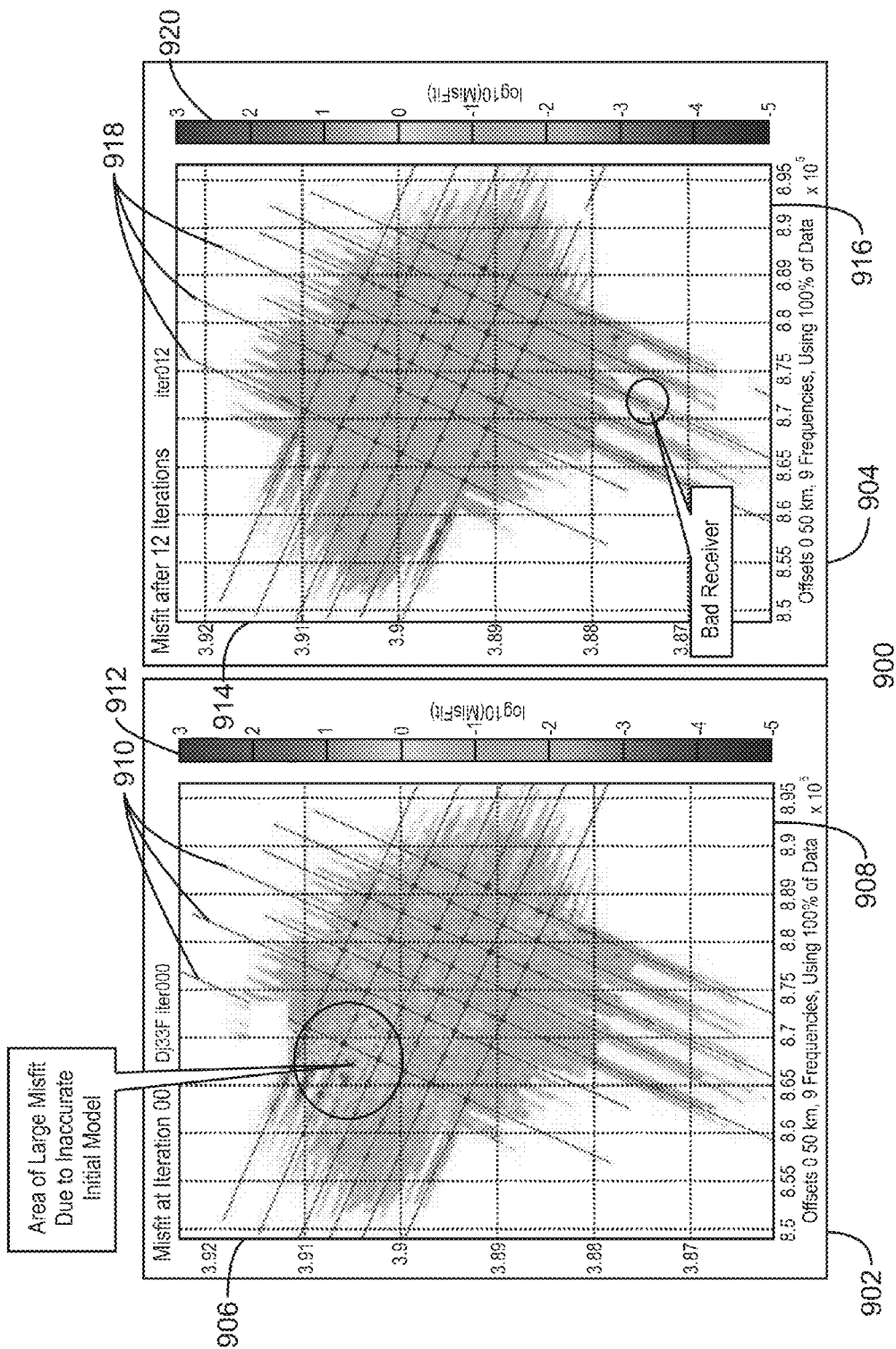
FIG. 9 is a set of graphs that are useful in explaining a process of areal misfit evolution during inversion, in accordance with an exemplary embodiment of the present techniques.

FIG. 9 is a set of graphs that are useful in explaining a process of areal misfit evolution during inversion, in accordance with an exemplary embodiment of the present techniques. The set of graphs is generally referred to by the reference number 900. The set of graphs 900 comprises a left panel 902 and a right panel 904. The left panel 902 and the right panel 904 are examples of an areal view of misfit information, in which misfit is shown for a specific area of interest.

The left panel 902 represents misfit at the beginning of an inversion process (iteration 00). A y-axis 906 corresponds to distance in units of meters $\times 10^5$. An x-axis 908 corresponds to distance in units of meters $\times 10^5$. A plurality of source tow lines 910, allow a user to identify specific locations within the data displayed. A legend 912 relates levels of misfit to specific colors. By providing misfit data in color, exemplary embodiments of the present techniques allow a user to easily determine which regions of the misfit visualization shown in the left panel 902 have relatively high or low levels of misfit. For example, the upper left region of the left panel 902 represents an area of relatively large misfit due to an inaccurate initial model. Input data for regions having high misfit values may be adjusted using expert information or other techniques before computing subsequent iterations of synthetic model data. In addition, corresponding model properties in the model domain may be adjusted to improve the predictive ability of the model when model information is transformed into the data domain.

The right panel 904 represents data misfit after several iterations of an inversion process have taken place (for example, iteration 12 relative to the left panel 902). A y-axis 914 corresponds to distance in units of meters $\times 10^5$. An x-axis 916 corresponds to distance in units of meters $\times 10^5$. A plurality of source tow lines 918, allow a user to identify specific locations within the data displayed. A legend 920 relates levels of misfit to specific colors. By providing misfit data in color, exemplary embodiments of the present techniques allow a user to easily determine areas shown in the right panel 904 that have relatively high or low levels of misfit.

A comparison of the left panel 902 and the right panel 904 shows areas of good and poor fit and their evolution during the inversion process. The misfit data frequently implies a geological meaning in the data predicted by forward modeling. Nonetheless, an area with persisting high misfit may indicate a problem with data quality (for example, a defective receiver). As shown by FIG. 9, exemplary embodiments of the present techniques can be adapted to compute differences between the gridded misfits and to highlight subtle variations in map view. Difference maps can be computed between iterations belonging to either the same or different rounds of inversion. That data may be used to adjust data using expert knowledge or other techniques prior to performing additional iterations. For example, a persistently large misfit may allow a user to mute or remove the data for the corresponding receiver from subsequent iterations.

Figure 10:
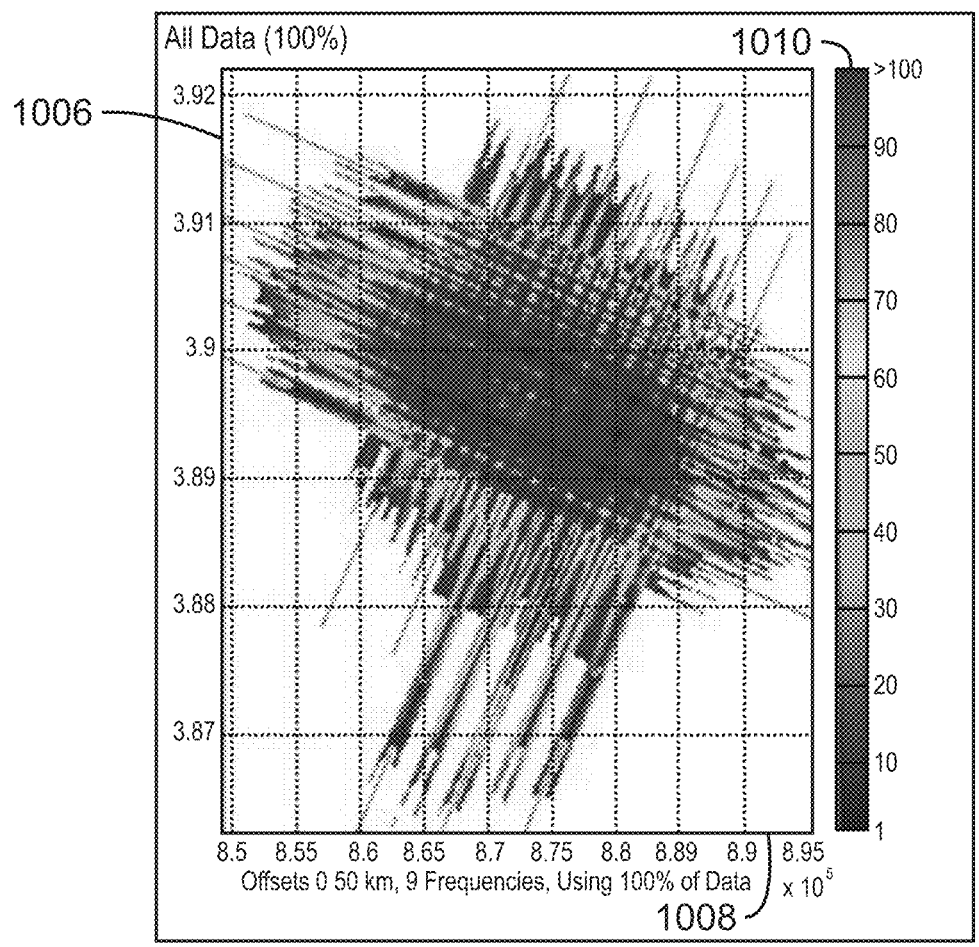
FIG. 10 is a graph that is useful in explaining misfit analysis based on data density, in accordance with an exemplary embodiment of the present techniques.

FIG. 10 is a graph that is useful in explaining misfit analysis based on data density, in accordance with an exemplary embodiment of the present techniques. The graph is generally referred to by the reference number 1000. The graph 1000 shows an exemplary visualization of data density.

The graph 1000 represents misfit information for a forward modeling operation based on all collected data. A y-axis 1006 corresponds to distance in units of meters $\times 10^5$. An x-axis 1008 corresponds to distance in units of meters $\times 10^5$. A legend 1010 relates levels of data density to specific colors. By providing data density in color, exemplary embodiments of the present techniques allow a user to easily identify regions where there is good data coverage versus regions where data coverage may be inadequate. One would expect model updates to be less reliable where there is less data density.

Figure 11:
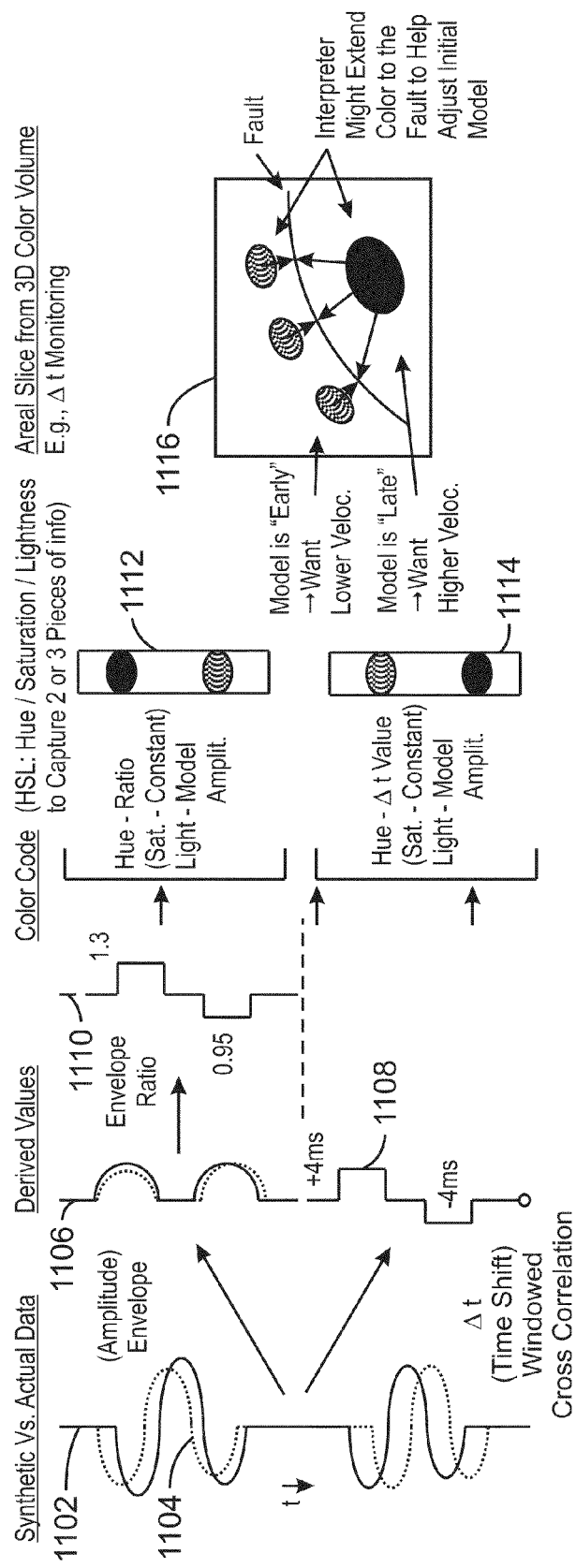
FIG. 11 is a diagram that is useful in explaining the creation of a physical property model using seismic information according to an exemplary embodiment of the present techniques.

FIG. 11 is a diagram that is useful in explaining the creation of a physical property model using seismic information according to an exemplary embodiment of the present techniques. The diagram is generally referred to by the reference number 1100. The diagram 1100 illustrates steps that may be taken to express misfit of seismic data in accordance with an exemplary embodiment of the present techniques to facilitate the process of providing physical property models.

An actual data trace 1102 represents actual seismic data that is acquired during a seismic prospecting operation. A synthetic data trace 1104 represents synthetic seismic data that is produced by a forward modeling process, as described herein.

Misfit of the synthetic data represented by the synthetic data trace 1104 relative to the actual data represented by the actual data trace 1102 may be expressed in terms of amplitude misfit or timing misfit. Amplitude misfit is represented by an amplitude misfit trace 1106. The amplitude misfit trace 1106 may represent an envelope ratio of the actual data trace 1102 relative to the synthetic data trace 1104. The envelope ratio may be expressed as an envelope ratio trace 1110. Timing misfit is represented by a timing difference trace 1108.

The seismic misfit information may be correlated to ranges of color, with specific ranges of misfit being represented by specific colors. In addition, additional data may be captured by employing a hue/saturation/lightness scheme in which hue, saturation and lightness each represent separate pieces of information.

In the diagram 1100, an amplitude misfit visualization 1112 shows the misfit between the actual data trace 1102 and the synthetic data trace 1104 using color variation, as explained herein. Similarly, a timing misfit visualization 1114 may be created to show the timing misfit between the actual data trace 1102 and the synthetic data trace 1104. For both the amplitude misfit visualization 1112 and the timing misfit visualization 1114, blank (uncolored) space between areas that indicate a misfit value may represent the absence of meaningful data where the lightness value is low.

An areal misfit visualization 1116 may be created to represent misfit for a large number of traces of seismic data. The areal misfit visualization 1116 shows differing degrees of misfit on either side of a fault. An interpreter with geologic knowledge may be able to provide insight to allow adjustment of data in the data domain or model information in the model domain based on patterns or observations about the misfit represented by the areal misfit visualization 1116. For example, the interpreter might suggest adjusting data to extend a color corresponding to a misfit range to the fault based on geologic knowledge. As described herein, this adjustment may improve efficiency in the creation of physical property models. Moreover, exemplary embodiments of the present techniques may reduce the cost of performing an inversion process to improve the accuracy of data used to provide physical property models.

Figure 12:
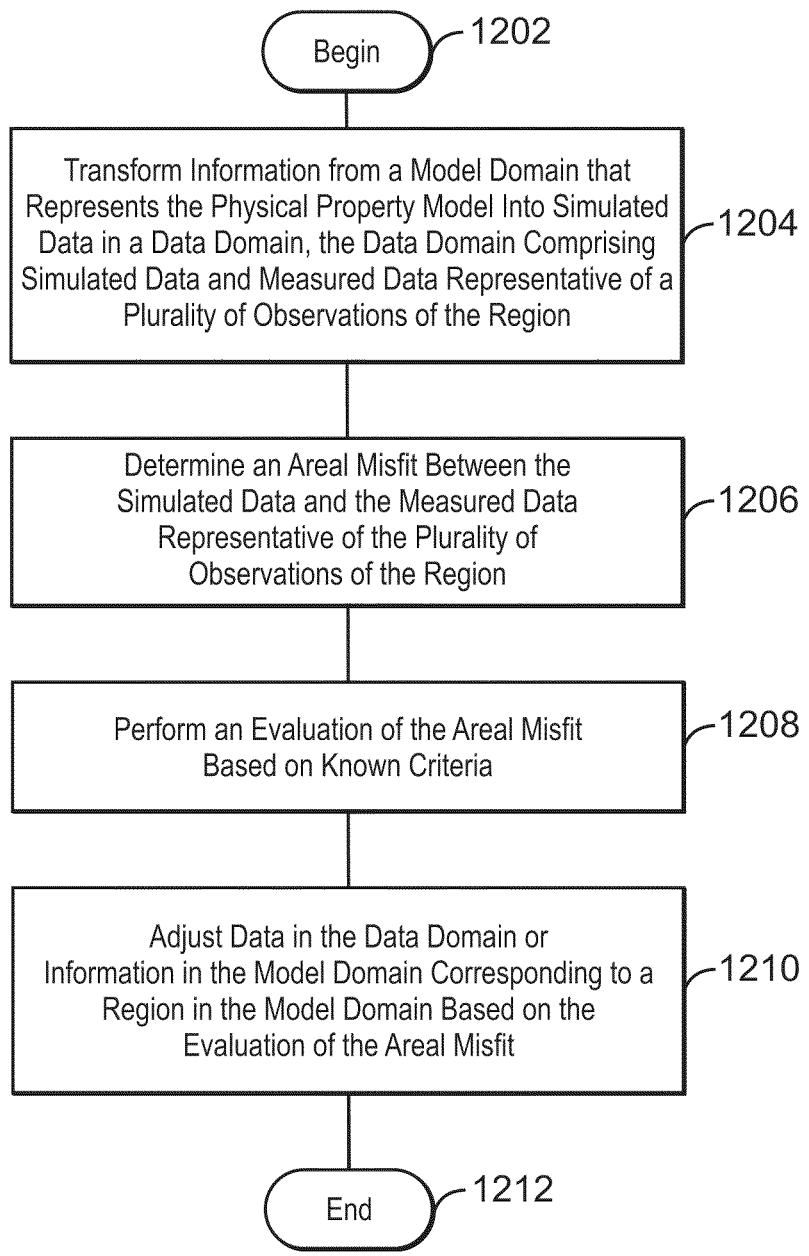
FIG. 12 is a process flow diagram showing a method for providing a physical property model, in accordance with an exemplary embodiment of the present techniques.

FIG. 12 is a process flow diagram showing a method for providing a physical property model, in accordance with an exemplary embodiment of the present techniques. The process is generally referred to by the reference number 1200. The physical property model may relate to a property that is relevant to the production of hydrocarbon resources, such as resistivity or porosity of a portion of a subsurface region. The process 1200 may be executed using one or more computer components of the type described herein with reference to FIG. 14. Such computer components may comprise one or more tangible, machine-readable media that stores computer-executable instructions. The process 1200 begins at block 1202.

At block 1204, information is transformed from a model domain that represents the physical property model into simulated data in a data domain. The data domain may comprise data representative of a plurality of observations of the region. An areal misfit between the simulated data and the data representative of the plurality of observations of the region is determined, as shown at block 1206. At block 1208, an evaluation of the areal misfit is performed based on known criteria.

Data in the data domain or information in the model domain corresponding to a region in the model domain is adjusted based on the evaluation of the areal misfit, as shown at block 1210. At block 1212, the process ends.

Figure 13:
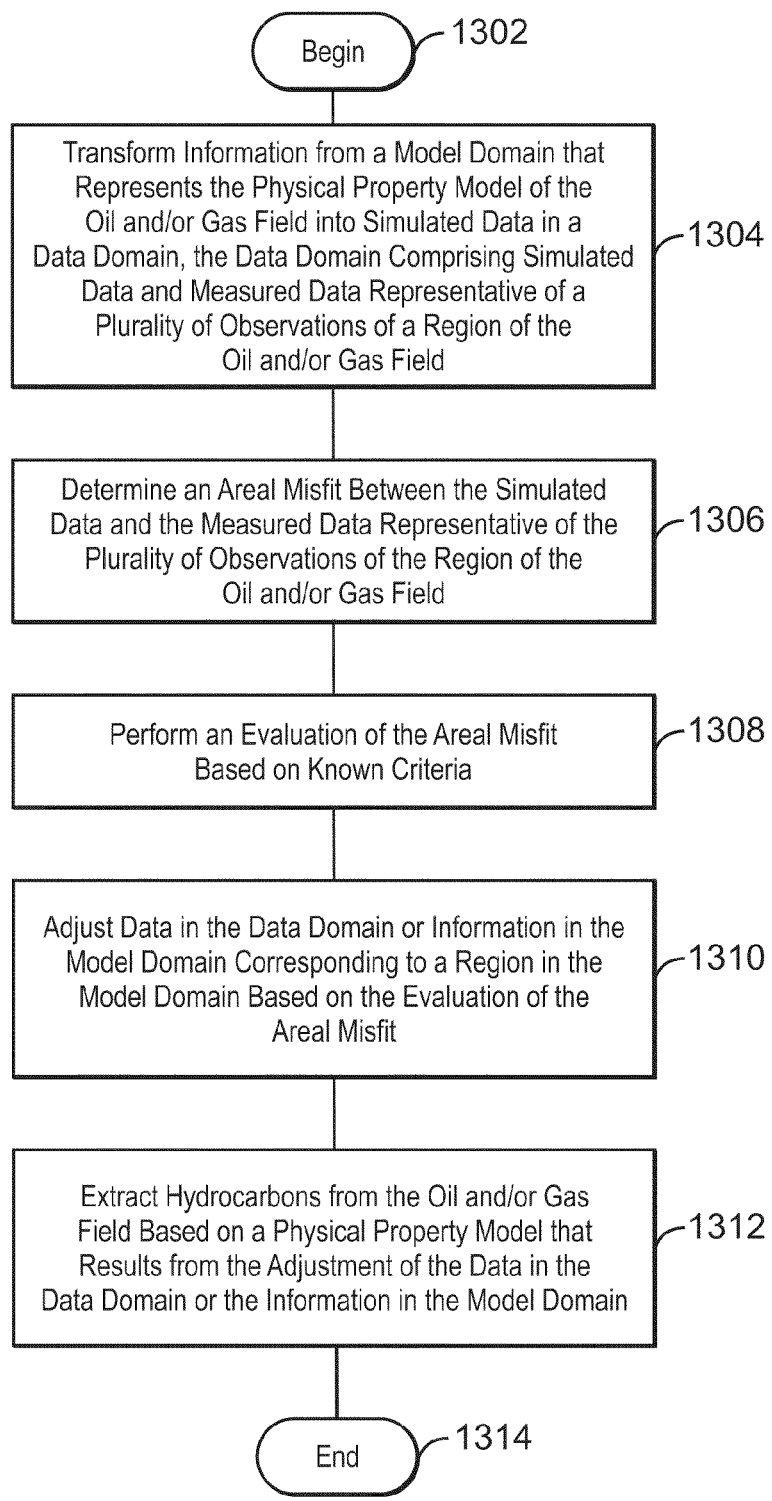
FIG. 13 is a process flow diagram showing a method for producing hydrocarbons from a subsurface region such as an oil and/or gas field according to exemplary embodiments of the present techniques.

FIG. 13 is a process flow diagram showing a method for producing hydrocarbons from a subsurface region such as an oil and/or gas field according to exemplary embodiments of the present techniques. The process is generally referred to by the reference number 1300. According to an exemplary embodiment of the present techniques, hydrocarbon production is facilitated through the use of a data model representative of a physical property.

Those of ordinary skill in the art will appreciate that the present techniques may facilitate the production of hydrocarbons by producing visualizations that allow geologists, engineers and the like to determine a course of action to take to enhance hydrocarbon production from a subsurface region. By way of example, a visualization produced according to an exemplary embodiment of the present techniques may allow an engineer or geologist to determine a well placement to increase production of hydrocarbons from a subsurface region. At block 1302, the process begins.

At block 1304, information is transformed from a model domain that represents the physical property model of the oil and/or gas field into simulated data in a data domain. The data domain may comprise data representative of a plurality of observations of a region of the oil and/or gas field. At block 1306, an areal misfit between the simulated data and the data representative of the plurality of observations of the region of the oil and/or gas field is determined. An evaluation of the areal misfit is performed based on known criteria, as shown at block 1308.

Data in the data domain or information in the model domain corresponding to a region in the model domain is adjusted based on the evaluation of the areal misfit, as shown at block 1310. At block 1312, hydrocarbons are extracted from the oil and/or gas field based on a physical property model that results from the adjustment of the data in the data domain or the information in the model domain. The process ends at block 1314.

Figure 14:
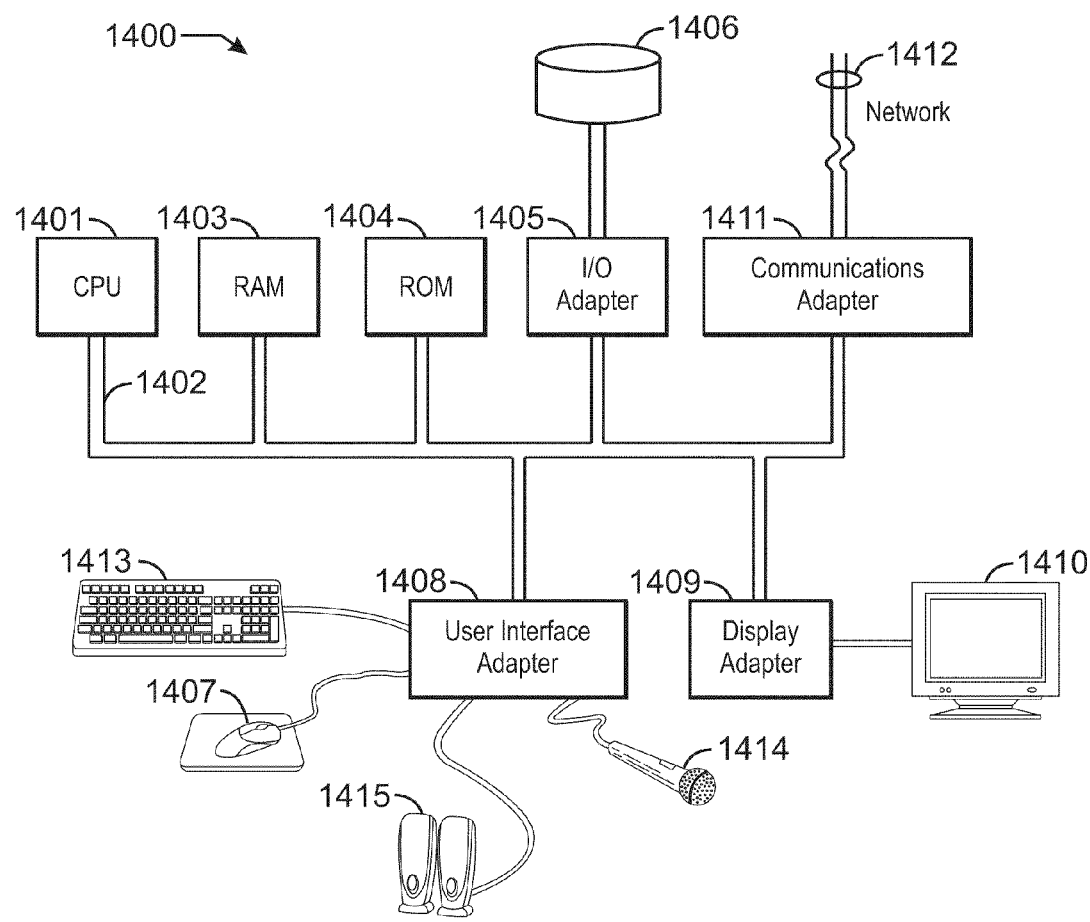
FIG. 14 is a block diagram of a computer system that may be used to perform a method for providing a physical property model according to exemplary embodiments of the present techniques.

FIG. 14 is a block diagram of a computer system that may be used to perform a method for providing a physical property model according to exemplary embodiments of the present techniques. The computer network is generally referred to by the reference number 1400.

A central processing unit (CPU) 1401 is coupled to system bus 1402. The CPU 1401 may be any general-purpose CPU, although other types of architectures of CPU 1401 (or other components of exemplary system 1400) may be used as long as CPU 1401 (and other components of system 1400) supports the inventive operations as described herein. The CPU 1401 may execute the various logical instructions according to various exemplary embodiments. For example, the CPU 1401 may execute machine-level instructions for performing processing related to providing physical property models according to the operational flow described herein with reference to FIG. 12 and FIG. 13.

The computer system 1400 may also include computer components such as a random access memory (RAM) 1403, which may be SRAM, DRAM, SDRAM, or the like. The computer system 1400 may also include read-only memory (ROM) 1404, which may be PROM, EPROM, EEPROM, or the like. RAM 1403 and ROM 1404 hold user and system data and programs, as is known in the art. The computer system 1400 may also include an input/output (I/O) adapter 1405, a communications adapter 1411, a user interface adapter 1408, and a display adapter 1409. The I/O adapter 1405, the user interface adapter 1408, and/or communications adapter 1411 may, in certain embodiments, enable a user to interact with computer system 1400 in order to input information.

The I/O adapter 1405 preferably connects a storage device (s) 1406, such as one or more of hard drive, compact disc (CD) drive, floppy disk drive, tape drive, etc. to computer system 1400. The storage device(s) may be used when RAM 1403 is insufficient for the memory requirements associated with storing data for operations of embodiments of the present techniques. The data storage of the computer system 1400 may be used for storing information and/or other data used or generated as disclosed herein. The communications adapter 1411 may couple the computer system 1400 to a network 1412, which may enable information to be input to and/or output from system 1400 via the network 1412 (for example, the Internet or other wide-area network, a local-area network, a public or private switched telephony network, a wireless network, any combination of the foregoing). User interface adapter 1408 couples user input devices, such as a keyboard 1413, a pointing device 1407, and a microphone 1414 and/or output devices, such as a speaker(s) 1415 to the computer system 1400. The display adapter 1409 is driven by the CPU 1401 to control the display on a display device 1410 to, for example, display information or a representation pertaining to a portion of a subsurface region under analysis, such as displaying a curved path and associated data that varies along the curved path, according to certain exemplary embodiments.

The architecture of system 1400 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

The present techniques may be susceptible to various modifications and alternative forms, and the exemplary embodiments discussed above have been shown only by way of example. However, the present techniques are not intended to be limited to the particular embodiments disclosed herein. Indeed, the present techniques include all alternatives, modifications, and equivalents falling within the spirit and scope of the appended claims.

What is claimed is:

1. A method for creating a physical property model representative of a physical property of a region, comprising:
    transforming information from a model domain that represents the physical property model into simulated data in a data domain, the data domain comprising simulated data and measured data representative of a plurality of observations of the region, wherein the transforming is performed using a computer;
    determining an areal misfit between the simulated data and the measured data representative of the plurality of observations of the region, wherein areal misfit means misfit determined at a plurality of locations within the region, said locations each being specified by at least one of a receiver location and a source location;
    performing an evaluation of the areal misfit based on known criteria; and
    adjusting data in the data domain or information in the model domain corresponding to a region in the model domain based on the evaluation of the areal misfit.

2. The method recited in claim 1, comprising providing a visual representation of the areal misfit including misfit values for each of a plurality of data elements, each of the plurality of data elements corresponding to an observation of the region.

3. The method recited in claim 1, comprising providing a visual representation of information in the model domain.

4. The method recited in claim 1, wherein the data model comprises controlled source electromagnetic (CSEM) data.

5. The method recited in claim 1, wherein the data model comprises seismic data.

6. The method recited in claim 1, comprising performing a subsequent transformation step using a result of the adjusting step as input.

7. The method recited in claim 1, comprising providing a visualization that expresses data density.

8. The method recited in claim 1, comprising displaying the areal misfit using variations in color to correspond to variations in the misfit.

9. The method recited in claim 1, wherein the known criteria are based on geologic knowledge.

10. A method for producing hydrocarbons from an oil and/or gas field using a physical property model representative of a physical property of the oil and/or gas field, the method comprising:
    transforming information from a model domain that represents the physical property model of the oil and/or gas field into simulated data in a data domain, the data domain comprising simulated data and measured data representative of a plurality of observations of a region of the oil and/or gas field, wherein the transforming is performed using a computer;

determining an areal misfit between the simulated data and the measured data representative of the plurality of observations of the region of the oil and/or gas field, wherein areal misfit means misfit determined at a plurality of locations within the region, said locations each being specified by at least one of a receiver location and a source location;

performing an evaluation of the areal misfit based on known criteria;

adjusting data in the data domain or information in the model domain corresponding to a region in the model domain based on the evaluation of the areal misfit; and extracting hydrocarbons from the oil and/or gas field based on a physical property model that results from the adjustment of the data in the data domain or the information in the model domain.

11. The method recited in claim 10, comprising providing a visual representation of the areal misfit including misfit values for each of a plurality of data elements, each of the plurality of data elements corresponding to an observation of the region.

12. The method recited in claim 10, comprising providing a visual representation of information in the model domain.

13. The method recited in claim 10, wherein the data model comprises controlled source electromagnetic (CSEM) data.

14. The method recited in claim 10, wherein the data model comprises seismic data.

15. The method recited in claim 10, comprising performing a subsequent transformation step using a result of the adjusting step as input.

16. The method recited in claim 10, comprising providing a visualization that expresses data density.

17. The method recited in claim 10, comprising displaying the areal misfit using variations in color to correspond to variations in the misfit.

18. The method recited in claim 10, wherein the known criteria are based on geologic knowledge.

19. A computer system that is adapted to create a physical property model representative of a physical property, the computer system comprising:

a processor; and a tangible, machine-readable storage medium that stores machine-readable instructions for execution by the processor, the machine-readable instructions comprising:

code that, when executed by the processor, is adapted to cause the processor to transform information from a model domain that represents the physical property model into simulated data in a data domain, the data domain comprising simulated data and measured data representative of a plurality of observations of a region;

code that, when executed by the processor, is adapted to cause the processor to determine an areal misfit between the simulated data and the measured data representative of the plurality of observations of the region, wherein areal misfit means misfit determined at a plurality of locations within the region, said locations each being specified by at least one of a receiver location and a source location;

code that, when executed by the processor, is adapted to cause the processor to perform an evaluation of the areal misfit based on known criteria; and code that, when executed by the processor, is adapted to cause the processor to adjust data in the data domain or information in the model domain corresponding to a region in the model domain based on the evaluation of the areal misfit.

20. The computer system recited in claim 19, wherein the machine-readable instructions comprise code that, when executed by the processor, is adapted to cause the processor to provide a visual representation of the areal misfit including misfit values for each of a plurality of data elements, each of the plurality of data elements corresponding to an observation of the region.

21. The method of claim 1, wherein the adjusting comprises updating the model in the model domain.

22. The method of claim 1, wherein the adjusting comprises discarding or muting a portion of the measured data in the data domain.

23. The method of claim 1, wherein the adjusting comprises re-simulation of at least a portion of the simulated data in the data domain, with one or more changed simulation parameters.

* * * * *